US009679290B2

(12) United States Patent
Hazel et al.

(10) Patent No.: US 9,679,290 B2
(45) Date of Patent: *Jun. 13, 2017

(54) PERSONAL TOKEN READ SYSTEM AND METHOD

(71) Applicant: VeriFone, Inc., San Jose, CA (US)

(72) Inventors: Patrick K. Hazel, Rancho Santa Fe, CA (US); Scott Yale, La Mesa, CA (US); Clay von Mueller, San Diego, CA (US)

(73) Assignee: Verifone, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,899

(22) Filed: Aug. 11, 2015

(65) Prior Publication Data

US 2016/0027003 A1     Jan. 28, 2016

Related U.S. Application Data

(60) Division of application No. 11/839,053, filed on Aug. 15, 2007, now Pat. No. 9,141,953, which is a continuation-in-part of application No. 11/550,387, filed on Oct. 17, 2006, now Pat. No. 8,769,275.

(51) Int. Cl.
| | |
|---|---|
| *G06Q 20/00* | (2012.01) |
| *G06Q 20/36* | (2012.01) |
| *G06Q 20/08* | (2012.01) |
| *G06Q 20/12* | (2012.01) |
| *G06Q 20/38* | (2012.01) |
| *H04L 9/32* | (2006.01) |
| *G06F 21/60* | (2013.01) |
| *G06Q 20/40* | (2012.01) |

(52) U.S. Cl.
CPC ......... *G06Q 20/367* (2013.01); *G06F 21/606* (2013.01); *G06Q 20/085* (2013.01); *G06Q 20/12* (2013.01); *G06Q 20/382* (2013.01); *G06Q 20/3823* (2013.01); *G06Q 20/3829* (2013.01); *G06Q 20/401* (2013.01); *G06Q 20/4012* (2013.01); *H04L 9/3234* (2013.01); *G06Q 2220/00* (2013.01); *H04L 2209/56* (2013.01)

(58) Field of Classification Search
CPC ... H04L 63/08; G06Q 20/382; G06Q 20/3674
USPC ............................................... 713/68; 705/64
See application file for complete search history.

(56) References Cited

U.S. PATENT DOCUMENTS

| | | | |
|---|---|---|---|
| 8,769,275 B2 * | 7/2014 | von Mueller | G06Q 20/085 705/35 |
| 9,141,953 B2 * | 9/2015 | Hazel | G06Q 20/085 |
| 2002/0042781 A1 * | 4/2002 | Kranzley | G06Q 20/02 705/75 |

(Continued)

*Primary Examiner* — James A Reagan
(74) *Attorney, Agent, or Firm* — Sheppard Mullin Richter & Hampton LLP

(57) ABSTRACT

A system for facilitating secure transactions between a purchaser and a vendor is provided. The system might include a purchaser token data capture device for reading token data into the system, an encryption module for encrypting the token data and a network based vendor input form for communicating the encrypted token data to the vendor. The system might further include a purchaser terminal for routing the encrypted token data to a transaction processing network or a vendor for providing payment and confirmation to the vendor of an authorized token.

16 Claims, 8 Drawing Sheets

(56) References Cited

U.S. PATENT DOCUMENTS

| | | | |
|---|---|---|---|
| 2003/0028481 A1* | 2/2003 | Flitcroft | G06Q 20/00 705/39 |
| 2003/0140007 A1* | 7/2003 | Kramer | G06Q 20/04 705/40 |
| 2004/0070566 A1* | 4/2004 | Ashton | G06F 3/03543 345/156 |
| 2007/0276765 A1* | 11/2007 | Hazel | G06F 21/72 705/71 |

* cited by examiner

PURCHASE FORM 130

Card Type

Card Account Number 136

Encryption Toggle 144

Card Expiration Date 139

Swipe Data 134

Purchaser Name 138

Purchaser Billing Address 141

Purchaser Shipping Address 142

Purchaser Account Reference 143

*Fig. 8*

PERSONAL TOKEN READ SYSTEM AND METHOD

CROSS-REFERENCE TO RELATED APPLICATIONS

This application is a divisional of, and claims priority to, U.S. application Ser. No. 11/839,053 filed Aug. 15, 2007, which issued as U.S. Pat. No. 9,141,953 on Sep. 22, 2015, which is a continuation-in-part of, and claims priority to, U.S. application Ser. No. 11/550,387 filed Oct. 17, 2006, and issued as U.S. Pat. No. 8,769,275 on Jul. 1, 2014, the disclosures of which are herein incorporated by reference in their entireties.

TECHNICAL FIELD

The present invention relates generally to secure transactions. In particular, some embodiments relate to secure transactions and access authorization.

DESCRIPTION OF THE RELATED ART

Token systems have been in use in modern civilization in various implementations to provide and control many forms of access. Access that can be and often times is controlled by tokens can include physical access to rooms, buildings, areas and so on; electronic access to servers and datafiles; electronic account access; and so on. Another form of access controlled by tokens is the ability to conduct transactions such as, for example, credit, debit and other financial transactions. Credit cards, charge cards, debit cards, loyalty cards and other purchase-related tokens are used to provide the consumers with ready access to funds. Such transactions can enhance convenience of purchases, extend credit to customers and so on.

Consumers are becoming more comfortable with shopping for goods and services online and transacting through internet websites. Initially, when online transactions became available, consumers were cautious about sending their sensitive credit card and/or banking information over a new medium. Security and the integrity of the transaction was an area of concern. As identity theft is on the rise, security is still a major concern for on-line and internet transactions.

In 2006, estimates for online holiday sales in December reached $24.6 billion, with Dec. 11, 2006 setting a new record for online spending, where consumers spent $661 million online. As the amount of online commerce expected to increase, so does the potential for fraud and abuse.

BRIEF SUMMARY OF EMBODIMENTS OF THE INVENTION

According to one or more embodiments of the invention, various features and functionality can be provided to enable or otherwise facilitate an online transaction with some level of protection from outside tampering or interception. Particularly, in accordance with one aspect of the invention, data security techniques such as, for example, various forms of encryption can be implemented with online transaction systems to provide a measure of security in consumer transactions. For example, such encryption techniques can be employed to secure account or other information in a financial data transaction between a consumer a vendor system. Particularly, in one embodiment, encryption techniques can be employed to secure some or all of a consumer's credit card information when the consumer uses his or her personal computer, or other terminal for online transactions.

In one embodiment, token information can be encrypted as the information is read by a data capture device at the purchaser's computer or other terminal device. For example, in one application, the token can be a credit card, debit card or other like financial transaction token. The data capture device can include a magnetic stripe reader connected to the customer's personal computer. An encryption module can be embedded in the magnetic striper reader (for example, in the read head), or in the computer itself. In one embodiment, the magnetic stripe reader can be stand-alone or integrated with a keyboard, mouse or other peripheral.

For example, in one application, an encryption module can be included to encrypt the data that is read from the token. Preferably, in one embodiment, the data is encrypted as soon as it is read from the token to provide an additional measure of security. To further enhance security in one embodiment, the encryption module, including encryption algorithms and keys, is encapsulated with the data capture device (which might be included with a terminal) and the encapsulation prevents or deters would be tamperers from reverse engineering encryption algorithms or obtaining the keys. Security measures can also be provided to destroy, alter or otherwise render encryption information unusable in the event of attempted tampering.

Another feature that can be provided in accordance with the present invention is a secure transaction module that can be used to, among other functions, decrypt data. For example, in one embodiment, a secure transaction module can be provided at one or more points in the transaction processing network to decrypt data that has been encrypted by the data capture device or to decrypt data that is encrypted on a token. Thus, this decryption functionality can be used to obtain clear text token data to facilitate consummation of the transaction. Secure transaction modules can be placed at appropriate points on the network depending on factors such as network security and desirability of obtaining clear text information at points along the network.

For example, in one embodiment, a secure transaction module can be included at a network router such as a gateway to provide decryption of some or all of the token data that has been encrypted to facilitate transaction routing and processing. The secure transaction module can also be configured to re-encrypt the data prior to transmission to another entity in the processing network. For example, a secure transaction module at a gateway might be included to decrypt a sufficient amount of the token data to facilitate further routing and leave the remainder of the data encrypted for later decryption by the transaction processor. As another example, the gateway might decrypt all of the token data as a service to the transaction processor and provide clear text data to the transaction processor to facilitate transaction processing. In such an embodiment, the secure transaction module at the gateway can be used to manage decryption services for a plurality of transaction locations and a plurality of transaction processors. Thus, the gateway can be configured to decrypt some or all of the token data as might be appropriate for the given transaction-processing network and the given transaction. The gateway might also be configured to re-encrypt some or all of this data prior to forwarding the information along to the transaction processor.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope or applicability of the invention. It should be noted that for clarity and ease of illustration these drawings are not necessarily made to scale.

FIG. 8 is a block diagram of a mouse illustrating an implementation of features that can be associated with the invention in accordance with one embodiment of the invention.

Figure 1:
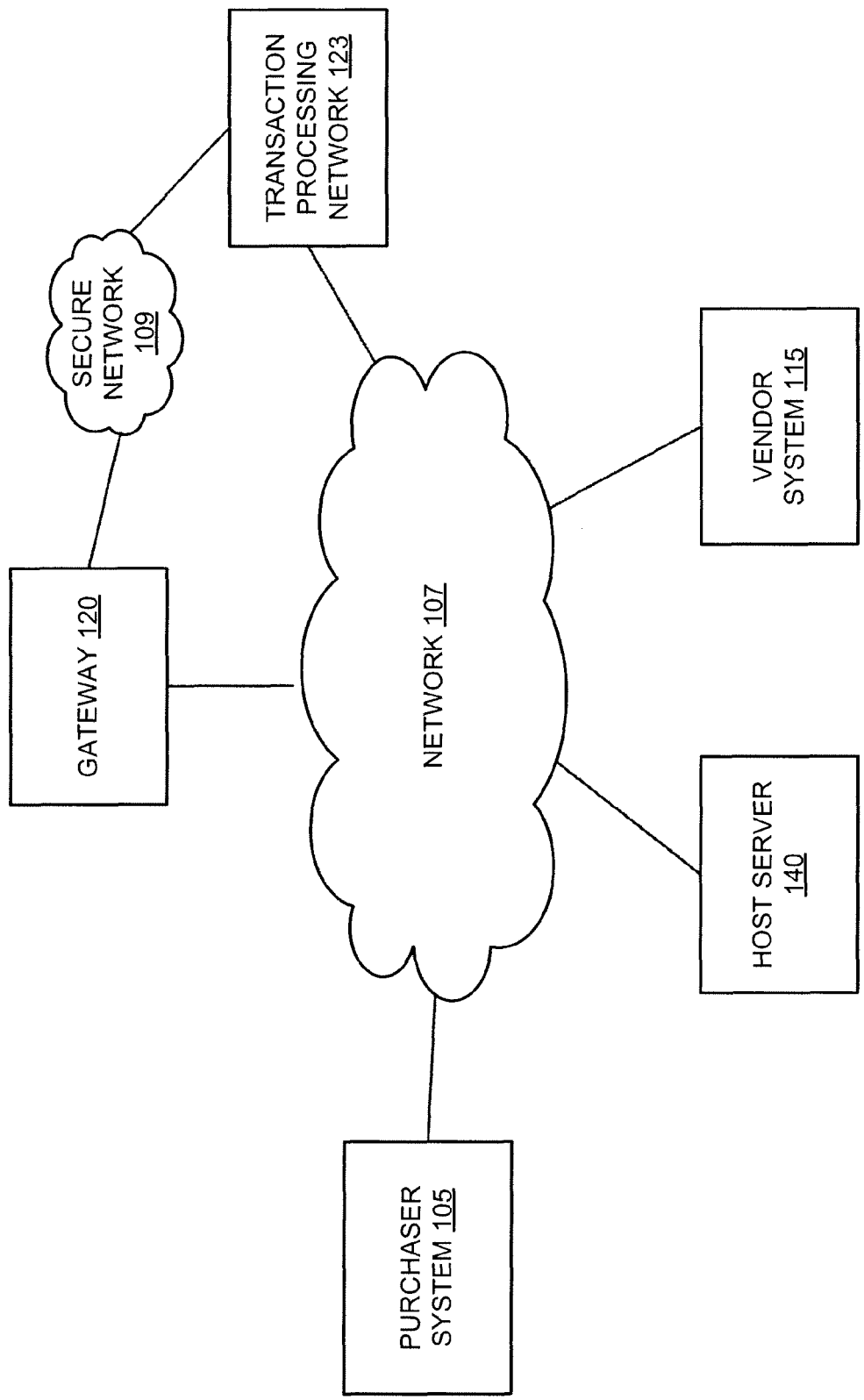
FIG. 1 is a diagram illustrating an overview of one example of a transaction network with which the present invention can be implemented.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for facilitating secure token transactions between purchasers and merchants. In one embodiment, the system provides systems and methods for secure token access across a communication medium.

Before describing the invention in detail, it is useful to describe an example environment with which the invention can be implemented. One such example is that of a transaction card network including a token used to facilitate purchases or other transactions. An example of transaction network is a token network that can be used to authorize and settle purchases of various goods and services. Illustrative examples of implementations of such a transaction network are the charge card, credit card and debit card transaction networks used to facilitate purchase transactions and banking transactions by and among merchants and other businesses, banks and other financial institutions and individuals. Generally speaking, in such a transaction network, the customer utilizes a charge card, credit card, debit card or other token as a symbol of his or her identity, or as an identification of the account he or she would like to have charged for the transaction. The token is typically accepted by the merchant, the account information read, and used to credit the transaction. Merchants might ask for a driver's license or other form of identification to verify the identity of the purchaser in conjunction with the token issued. With online purchases, a merchant might ask for the account holder name and billing address to facilitate authentication.

The token data is then sent to the appropriate financial institution or institutions, or other entities for processing. Processing can include, in one or more steps, authorization, approval and settlement of the account. In this example environment, examples of a token can include a charge card, debit card, credit card, royalty card or other token that can be used to identify such items as the customers, their account and other relevant information. As a further example, a card such as a credit or debit card can include various forms of technology to store data, such as a magnetic stripe technology, processor or smart card technology, bar code technology or other technology used to encode account number or other identification or information onto the token. As such, a properly encoded token can include various forms of information relating to the purchaser such as, for example, the identity of the purchaser, information associated with the purchaser's account, the issuing bank or other financial institution, the expiration date, and so on.

As only one example of a token, a credit card can be used with a conventional magnetic stripe included on one side thereof. Conventional magnetic stripes can include three tracks of data. Further to this example, the ISO/IEC standard 7811, which is used by banks, specifies: that track one is 210 bits per inch (bpi), and holds 79 six-bit plus parity bit read-only characters; track two is 75 bpi, and holds 40 four-bit plus parity bit characters; and track three is 210 bpi, and holds 107 four-bit plus parity bit characters. Most conventional credit cards use tracks one and two for financial transactions. Track three is a read/write track (that includes an encrypted PIN, country code, currency units, amount authorized), but its usage is not standardized among banks.

Having thus described an application of the invention in an example environment, the present invention is from time-to-time described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

The present invention is directed toward a system, apparatus and method for facilitating token access, and in one embodiment, providing enhanced security measures for token access. Particularly, in terms of the example and related environments, one embodiment provides security measures for financial transactions. One embodiment in this example application provides for encryption of some or all of the token data (credit card, charge card, debit card or other tokens) prior to transmission to the vendor for authorization or settlement. Decryption can be performed at one or more appropriate points along the transaction path to recover some or all of the original data to enable the financial institution to determine whether to authorize the transaction or to conclude the settlement process.

FIG. 1 is a diagram illustrating a simplified block diagram of a system for processing personal transactions in accordance with one embodiment of the invention. One example of a personal transaction is that of a customer purchasing goods or services via on-line or other remote access means. As a further example of a personal transaction, consider a user as a customer or purchaser accessing a vendor webpage over the Internet, and utilizing his or her computer system (or a friend's system or public system), separate from a vendor's system. Personal transactions in accordance with this example are now described with reference to FIG. 1, wherein a purchaser might desire to complete a purchase through a vendor website by payment with a credit card, debit card or other payment token.

To better illustrate the features of the invention, this example is described in terms of the token being a credit card having token information encoded in a magnetic stripe on the back of the card. In the illustrated example, a purchaser system 105 is provided by which the purchaser communicates during the course of a transaction. The purchaser system 105 might include, for example, a client device such as a personal computer with a purchaser magnetic stripe reader (or other token readers) connected to or integrated with the personal computer. In one embodiment, purchaser system 105 might be implemented with the capability to encrypt some or all of the card data. Preferably, the token information is encrypted before it leaves the reader (in the read head or otherwise in the reader) or before it leaves the purchaser system 105. The personal computer or other purchaser system 105 can be connected to the Internet or other communication networks or channels 107, which can provide connectivity to a vendor system 115 for entering into various transactions.

The vendor system 115 can be implemented as a means by which a vendor might communicate and transact with purchasers. The vendor system 115 might include, for example, a vendor website with product or service offerings, and might provide purchaser forms that can be sent to the purchaser system for display. For example, an html form might be provided and it might have blank fields for input of transaction information such as, for example, credit card data, billing address, shipping address, shipping instructions, and so on. Other fields might be prepopulated with information such as, for example, information from the purchaser's shopping cart, purchaser account information for registered users, and so on. A more specific example of a vendor form includes the one or more pages that might be sent to a purchaser when he or she initiates the checkout procedure from an internet retailer site. Html forms are only one example of a vendor form. As this example illustrates, a form can take on any of a number of different embodiments or formats and the term form is used to generally describe any document, file, transmission or data set that can be used to specify or facilitate a transaction.

In one embodiment, the forms can be provided to accept encrypted token or other information to enhance information security across the communication channel. In one embodiment, however, the token or other information is preferably encrypted into the same format as the original information such that the encryption might be transparent to the vendor system 115. For example, consider a 12-digit credit card number having twelve integer digits, each ranging from a "0" to a "9." Where hidden or transparent encryption is utilized, the encrypted account information that is placed in the form would likewise have twelve integer digits, each ranging from a "0" to a "9." In such embodiments, the vendor might simply pass the encrypted account information (or other encrypted information) along to the bank or other clearing entity for authorization and settlement, and the vendor might not know (or care) that the information is encrypted.

In one embodiment, when the purchaser swipes a credit card through a magnetic stripe reader at his or her computer, the data can be encrypted and the form can be populated with the encrypted card data. For example, the information can be read from the card, some or all of the information can be encrypted and the information used to automatically populate the form. In another embodiment, information might be obtained from other sources to populate the form or to augment the token information. For example, a user file stored on the user's computer (or a peripheral) might contain information (encrypted or otherwise) that can be used to populate the form or otherwise facilitate the transaction. The populated form, including the card data, can be sent to the vendor system 115 in furtherance of the transaction.

In one embodiment, the vendor system 115 obtains the information from the form and sends the appropriate information (for example, account number and transaction amount) to the transaction processing network 123 for authorization. In embodiments where some or all of the information is encrypted prior to transmission to the vendor, the vendor might be provided with the ability to decrypt the information for further processing. In a preferred embodiment, however, the vendor is not provided the ability to decrypt the information, but instead, forwards the information as received for processing by the transaction processing network 123.

In another embodiment, the vendor is provided the ability to decrypt some of the encrypted information. For instance, consider an example where credit card account information, user identification and other information is encrypted. The invention can be implemented such that the vendor can decrypt the user identification but not the account number etc. Separate keys might be used to encrypt different portions of the data to allow decryption of these different portions of data at various points along the network.

Typically, before the transaction is approved, terminal 104 seeks authorization from one or more entities in a transaction processing network 123. For example, the merchant might seek approval from the acquiring bank, the issuing bank, a clearing house or other entity that might be used to approve such transactions. Thus, depending on the token type, institutions involved and other factors, the transaction processing network 123 can be a single entity or institution, or it can be a plurality of entities or institutions. As a further example, in one embodiment, transaction processing network might include one or more processors or clearing houses to clear transactions on behalf of issuing banks and acquiring banks. The transaction processing network also include those issuing banks and acquiring banks. For example, one or more entities such as Global Payments, Visa, American Express, and so on, might be a part of transaction processing network. Each of these entities might have one or more processing servers to handle transactions.

In some instances, the approval might also constitute the final settlement of the transaction resulting in the appropriate funds being transferred to consummate the transaction. In other embodiments, however, the authorization might simply be an authorization only and actual account settlement can take place in a subsequent transaction. For example, authorization might verify the validity of certain information such as the account number, expiration date, customer name, and credit limit to determine whether to approve the transaction. Settlement might be accomplished when a series of one or more approved transactions are sent to the appropriate institution(s) for transfer of the funds or other account settlement.

As illustrated in FIG. 1, a gateway 120 can be included to facilitate routing of transactions, authorizations and settlements to and from the appropriate entity or entities within the transaction processing network 123. For example, where a merchant accepts credit cards from numerous different institutions, the gateway can use the BIN (Bank Identification Number) obtained from token 101 and passed to gateway 120 to route the transaction to the institution(s) associated with the given BIN. As illustrated by flow arrow 122, not all transactions are necessarily routed through a gateway 120. Transactions might take other paths to the appropriate entity or entities in the transaction processing network 123. Additionally, the term gateway as used herein is not restricted to conventional gateway applications, but is broad enough to encompass any server or computing system configured to perform any or all of the described functionality. The term gateway is used for convenience only.

Where a gateway 120 or other like entity is used to decrypt some or all of the encrypted information prior to transaction processing, it might be desirable to include a secure communication link between the gateway 120 and the transaction processing network 123. Accordingly, in one embodiment a secure communication link, network or other communication channel 109 can be provided between the gateway 120 and transaction processing network 123 to facilitate secure communications therebetween. This feature can help to secure the information that is encrypted by the gateway.

Although transaction processing network 123 is illustrated using only one block in the example block diagram environment of FIG. 1, this block can represent a single entity to which the transaction is routed for authorization or settlement, or a network of entities that might be involved with authorization and settlement. Communications among the various components in the example environment can be wired or wireless transmissions using a variety of communication technologies formats and protocols as might be deemed appropriate for the given environment. As one example, the currently available credit card processing network and protocol structure can be utilized as the environment with which embodiments of the invention can be implemented. In fact, in one embodiment of the invention, various features and functions of the invention can be implemented within current or legacy transaction processing networks to provide enhanced features while reducing the level of change or upgrade required to the networking infrastructure.

As noted above, in one implementation, hidden or transparent encryption is used such that the information can be passed along for processing by the vendor without regard to whether or not it is encrypted. In one embodiment, a decryption module can be provided at the gateway 120, at transaction processing network 123 or elsewhere in the transaction processing stream (as described further below) to facilitate transaction processing. The transaction processing network 123 can authorize the transaction and send a confirmation to the vendor system 115. The confirmation might involve an authorization for purchase whereby settlement is performed at a later time or a complete settlement of the account. In the latter case, the approval constitutes the final settlement of the transaction resulting in the appropriate funds being transferred to consummate the transaction. In the former case, however, the authorization might simply be an authorization only and actual account settlement can take place in a subsequent transaction. For example, authorization might verify the validity of certain information such as the account number, expiration date, customer name, and credit limit to determine whether to approve the transaction. Settlement might be accomplished when a series of one or more approved transactions are sent to the appropriate institution(s) for transfer of the funds or other account settlement.

In another embodiment, the information might be routed to a host server 140 by either the purchaser or the vendor. The host server might then be used to 'clear' the transaction with the encrypted token information and provide a verification to the vendor system 115. In such embodiments, the host system might then be involved with final transaction settlement between the transaction processing network 123 and the vendor 115. Although not illustrated in FIG. 1, secure communication links can be provided among gateway 120, host server 140 and transaction processing network 123 to facilitate secure communications among them.

Figure 2:
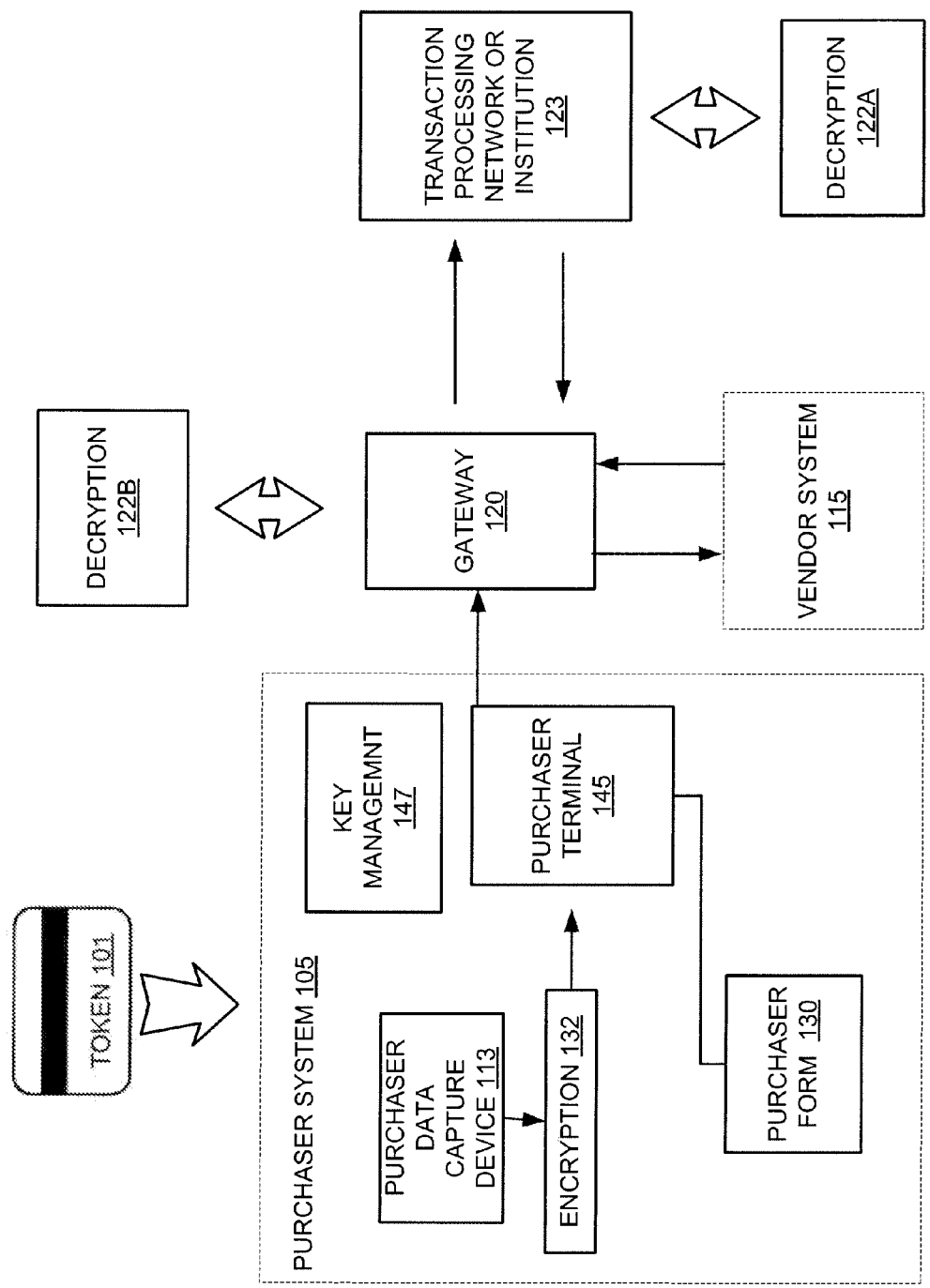
FIG. 2 is a diagram illustrating an implementation of features that can be associated with the invention in accordance with one embodiment of the invention.
Figure 3:
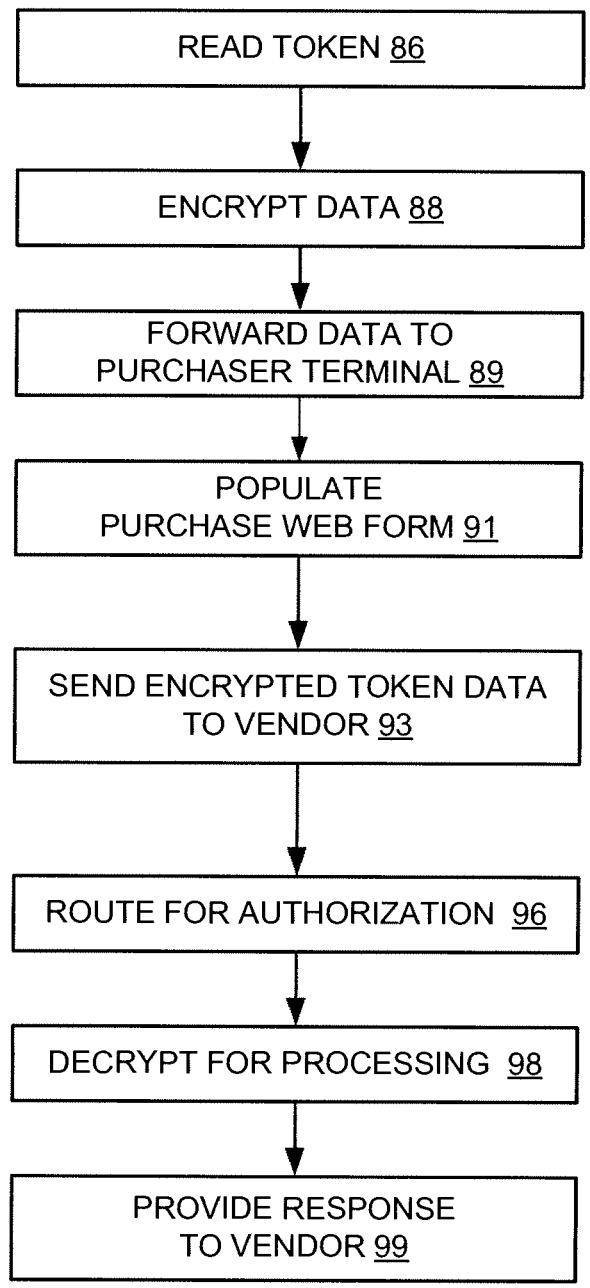
FIG. 3 is a diagram illustrating an implementation of features that can be associated with the invention in accordance with one embodiment of the invention.

FIGS. 2 and 3 are diagrams illustrating an example implementation of features and functionality associated with embodiments of the invention in terms of the example environment. FIG. 2 is a diagram illustrating an implementation of features that can be associated with the invention in accordance with one embodiment of the invention. FIG. 3 is an operational flow diagram illustrating a process for enabling secure token transactions in accordance with one embodiment of the invention. Referring now to FIGS. 2 and 3, in the example illustrated, purchaser system 105 is a computing system that can include a data capture device 113, an encryption module 132, a purchaser terminal 145 and a key management module 147. In one embodiment suitable for use with bank cards, purchaser data capture device 113 might be, for example, a magnetic stripe reader. In one embodiment, the magnetic stripe reader 113 can be incorporated in a mouse, trackball or other pointing device; a keypad; keyboard; a monitor; or other peripheral. In another embodiment, data capture device can be a stand-alone peripheral such as a magnetic stripe reader communicatively coupled to the user's computer such as, for example, via USB or W-USB. As these examples serve to illustrate, other forms of token reader and other interfaces to the user's client device can be provided.

In the current example of bank cards, the purchaser data capture device 113 accepts a credit card having a magnetic stripe, however, the system 100 can include any of a variety of forms of magnetic stripe readers to extract the data from the credit card. In other embodiments or implementations, other forms of purchaser data capture devices 113, or readers, can be used to obtain the information from a variety of different types of tokens 101. For example, bar code scanners, smart card readers, RFID readers, near-field devices, and other mechanisms can be used to obtain some or all of the data associated with a token 101 and used for the transaction.

Key management module 147 might be implemented to update and manage key information between purchaser system 105 and gateway 120 (or with other systems). For example, keys, encryption algorithms and other information can be managed and updated with the use of a key management module that can perform automatic or manual updates.

Referring now to FIGS. 2 and 3, in a Step 86, data from a token 101 is read by a purchaser data capture device 113.

As discussed above, a token 101 can take on any of the number of different forms, including the examples discussed above with reference to a token 101 in FIG. 1. In the current example, token 101 is a credit card token. As such, the magnetic stripe of the credit card is read in step 86. Additionally, in one embodiment, the data encoded in token 101 can be encrypted during the fabrication or creation of token 101 or in the writing of the data onto token 101. Although token data can be referred to as being "on" for "in" a token, or encoded "onto" or "into" a token, such as token 101, these terms are not meant to imply or require a particular physical structure for encoding the token with data.

In a Step 88, an encryption module 132, which can include one or more encryption algorithms, is used to encrypt some or all of the token data. Although the encryption in accordance with the invention can take place at a number of different points along the data stream, it is preferable for security purposes that the encryption takes place as soon as possible or practical in the data read cycle. Therefore, in one embodiment of the invention, the encryption module is in the data path immediately following the data capture. Preferably, then, the data can be encrypted as soon as it is read to enhance the security of the system. For example, encryption might be performed in the read head as the data is read from the card. Encryption might also be performed within the housing of the data capture device or might be performed by an application or other module within the user's computer or client device (for example, in a any purchaser client device, such as a PDA, keyboard, cell phone, monitor, personal computer or the like).

To further enhance security, and provide safeguards against copying, skimming, malicious code or other tampering, encryption module 132 can be encased in the same housing as the data capture assembly, such as in the stripe reader housing or encased in the head module itself. Further, they can be encased in epoxy and steel, or other tamper-safe components to provide safeguards against tampering. Thus, in one embodiment, the entire data capture device can be encapsulated in a tamper-resistant package. As a particular example of this, consider an example application of the invention to facilitate secure credit card transactions. In this example application, a purchaser data capture device 113 can be implemented as a magnetic stripe reader 150 with magnetic read or read/write heads used to extract data from the token 101.

In a step 89, the data captured by purchaser data capture device 113, and encrypted with encryption module 132, is forwarded to purchaser terminal 145 in furtherance of the transaction. In accordance with the example environment, purchaser terminal 145 can be an application or other module on the purchaser system. As a further example, purchaser terminal might be the user's computer or an application running on the user's personal computer system that he or she uses to conduct transactions. As a further example, consider an embodiment where the data capture device 113 is integrated with the user's mouse. In such an embodiment, the encryption can be performed in the read head, in the mouse or in the user's computer. The data is capture by the stripe reader and sent to the terminal via the mouse interface, which, in contemporary systems is typically a USB interface, but could be any suitable communication interface. Additionally, purchaser terminal 145 can include an encryption module to encrypt some or all of the data output by purchaser terminal 145.

In a step 91, the card data is used to populate a purchase form 130 from the vendor. In one embodiment, the purchase form 130 can be sent to the purchaser system for display on a monitor, cell phone, PDA or other display device. In one example illustrated in FIG. 8, the form may have blank fields 136 for input of the card data that may or may not be encrypted. Other fields might include a field 134 for swipe data, a purchaser or card holder name field 138, a card expiration date field 139, billing address fields 141, shipping address fields 142, and a field 143 for account references used by the vendor for referencing a particular purchaser's account. The form 130 might also include a toggle 144 for turning on or off the encryption or purchaser swipe functionality as elaborated in more detail below. Where a swipe data field 134 is included, the system might be configured to insert the track data from the card swipe into this field directly. For example, in one embodiment, Track data from the card is entered directly into this field 134. The data might be partially or fully encrypted, and, in one embodiment, it is encrypted in a transparent fashion. In another embodiment, the track data might be parsed from the data stream and used to populate automatically some or all of the other fields. In the illustrated embodiment, the form 130 can be displayed on a monitor such as a CRT, plasma or LCD, or other monitor. As this example illustrates, other methods or devices can be used for display of the content.

As discussed above, in some embodiments, the card data is encrypted before entry into the form. According to some embodiments, the purchaser might add data to the form 130 and/or data stored on the client device 110 might also added to the form 130. Accordingly, the data can be encrypted at the purchaser terminal 145 prior to entry in the form and transmission to the vendor. In one embodiment, the processor, ASIC, software, firmware or other control logic used to decrypt or encrypt the data, and the associated keys, can be packaged in a secure manner such that if it is tampered with, the keys or other encryption information are automatically erased or otherwise destroyed. In another embodiment, the data capture device along with terminal components can be likewise packaged in a secure manner.

In one embodiment, the data entered on the form is preferably packaged in a manner as might be expected by the form or by the vendor. Thus, any of a number of packaging formats can be adopted for this and other communication channels in the transaction chain. However, in one embodiment, data capture device 113 can be implemented to package or format the data in a way that would be compatible with forms that might have been in use with previously existing data capture devices or manual form entry techniques that did not include encryption capabilities. As a specific example of this, consider again the example application of a credit card transaction. In this example environment, a large number of vendors are operational with forms suitable for conventional, unencrypted credit transactions. Therefore, the data capture device or the terminal can be configured to encrypt the data, place the encrypted string into the same format as the clear data that it replaces, and place it in the appropriate location on the form. The vendor receiving the form could then handle the transaction as a conventional transaction (for example, unencrypted transaction). In one embodiment, the terminal can check the check data (for example, with parity, LRC and a mod 10 check), which should be correct as it was regenerated by the encryption module using the inserted encrypted string. If the token fails, a bad read status can be output.

Thus, simply providing data encryption at the data capture device (e.g. at the magnetic stripe reader) or at the terminal could result in data incompatibility with vendor forms, and with the rest of the network in some applications. As such, this embodiment packages the encrypted portions of the data with the clear text portions of the data in the same package format as the data would otherwise be entered in the form. As such, transactions (credit card transactions in this example) can be carried out in their usual fashion, without requiring vendor form upgrades. As a further example of this, consider the example described above, but now assume that the personal account number of a credit card is encrypted as follows: the first six digits, or the bank identification number, are left in clear text, the next six digits are encrypted, and the last four digits of the account number are left in clear text. Thus, in this example, the encryption can be implemented such that the original six digits of the account number that are encrypted are replaced by an identical quantity (i.e. six) of encrypted digits, and these six encrypted digits are placed in the same position as the six clear text digits occurred in the account number of the data stream. As a result, the original packaging format of the Track Data is intact, and the data capture device with the encryption features (whether a new device or a retrofitted device) can be integrated into the network and be compatible with forms that are expecting data from non-encrypting magnetic stripe readers.

In another embodiment, forms can be provided with an entry field for swiped data. In such an embodiment, for example, a field might be provided on the form wherein the data read from the token is entered as read from the card. For example, rather than having a separate field for account number, expiration date, card type, etc, the form can be configured to accept the data as swiped or read from the token (with or without encryption). Thus, the vendor might be configured to accept the data from this field as the data would otherwise be provided to the vendor from a point of sale terminal, for example. As with the other embodiments, hidden or transparent encryption can be used to maintain the same data format as would otherwise be anticipated by the vendor.

Continuing with the above example, in one embodiment, the read head might be configured to read the magnetically encoded data and to output a series of data transitions. The transitions might be converted to a series of characters representing the track data by encryption module 132. Encryption module 132 can further be configured to generate an LRC and check sum, if appropriate to the application. Thus, encryption module 132 creates track data character strings. Encryption module 132 is further configured to parse this track data to select appropriate portions of this data for encryption. For example, encryption module 132 might select portions of the account information for encrypting, while masking other data such as, for example, the BIN and expiration date. In one embodiment, encryption module 132 can be configured to re-package the data so that it is in the same format package as the unencrypted data. The encrypting head can be configured to encrypt the Track 2 card data selectively based on BIN number and POS/system requirements or otherwise. The data can be tested for accuracy with parity, LRC, and a Mod 10 check. If the card fails the parity or LRC checks, a "bad read" status is output. If the card passes the other checks and passes the Mod 10 check, the card BIN number is used to access the encryption parameters and keys. In one embodiment, each time the terminal head successfully decodes and encrypts card data, a counter can be incremented. In one embodiment, different counters can be established and updated for particular BINs or BIN ranges. In one embodiment, a six-digit counter is sufficient to allow enough "uniqueness" in each transaction. In one embodiment, the two least significant digits are output with the card data (for example, in the PVV (pin verification value) field or other field) for use by the decryption module.

In a step 93, a secure data stream is forwarded by purchaser system 105 to the vendor system 115. As such, purchaser terminal 145 can use or forward some or all of the elements of data as appropriate in conducting the transaction. The vendor, then, receives the forms used by purchaser to purchase goods or services from the vendor. As noted, the form might include item numbers, quantities, billing information, shipping information, credit card information, and so on. As also noted, in one embodiment, the encryption is performed in a hidden or transparent manner so as to be transparent to the vendor. In another embodiment, encryption might be disabled, thereby populating the form with all clear-text information. In another embodiment a toggle, switch, radio button or other means of selection might be included on the form to toggle encryption on or off. In yet another embodiment, enablement/disablement of encryption is selected by the terminal or at the encryption device.

Continuing with the example of a credit card sale, the vendor system 115 can proceed to a step 96 and route the transaction data to obtain authorization for the transaction. In one embodiment, the vendor system 115 extracts data from the form 130 and routes the appropriate transaction data to a transaction processing network 123 for authorization or settlement. In the example illustrated in FIG. 2, the data is routed via a gateway 120, which routes the transaction to the appropriate network or entities within a network for processing. In one embodiment, the data stream routed by vendor system 115 can include some or all of the data provided in the secure data stream, and can be augmented to provide additional data as might be appropriate for the environment or type of transaction.

In one embodiment, the data might be routed and treated the identically whether the data is encrypted or unencrypted. If, for example, the data is routed to a gateway 120, the gateway 120 can detect encryption and decrypt the data transparently to the vendor system 115. Thus, the encrypted data can be kept or formatted in the same format as expected by the transaction processing network. Alternatively, the vendor system 115 might decrypt the data for processing at the vendor itself. For example, if the card data reflects a gift card, or a vendor issued credit card, the vendor will manage all of the processing.

As discussed above with reference to FIG. 1, a gateway 120 might or might not be involved in the transaction routing depending on the application or transaction and the network configuration and participants, and other parameters such as, for example, the complexity of the network and the routing options available. For example, where multiple terminals 114 can be used to carry out transactions for credit cards from a plurality of issuing authorities, a gateway functionality can be useful to route the transaction data among the terminals and the elements of the transaction processing network.

Gateways can be implemented using hardware software or a combination thereof. In one embodiment, gateway 120 is implemented as one or more processing devices configured to run software applications for the gateway functionality. In one or more embodiments discussed in this document, functions such as encryption, decryption, key storage and other related functions are at times discussed as being performed at or by a gateway. This description encompasses implementations where functions are performed using a separate module or appliance called by or otherwise accessed by the gateway. For example, in one or more embodiments, these functions are described as being performed by a secure transaction module that can be either a part of the gateway or accessed by the gateway. As will be apparent to one of ordinary skill in the art after reading this description, such discussion can indicate that the same devices that perform gateway functionality can also include hardware or software modules used to perform these encryption, decryption or other functions as well.

Alternatively, separate modules can be in communicative contact with the gateways and their functions called, accessed or used by the gateway to perform the encryption, decryption 122 or other related functions. Indeed, in one embodiment, one or more separate appliances are provided to perform various decryption, encryption, key storage and updating and other functions, and the appropriate transaction data routed to the appropriate appliance for processing. Such appliances can themselves be implemented using hardware software or a combination thereof, and can be coupled in communicative contact with the gateway. As discussed herein, such appliances (sometimes also referred to as secure transaction modules) can be associated with entities other than the gateway, including issuing banks, acquiring banks, clearing houses, merchants and other entities that might be associated with, the transaction processing network 123.

In one embodiment, a secure transaction module can be included at a network router such as a gateway to provide decryption of some or all of the token data that has been encrypted to facilitate transaction routing and processing. The secure transaction module can also be configured to re-encrypt the data prior to transmission to another entity in the processing network. For example, a secure transaction module at a gateway might be included to decrypt a sufficient amount of the token data to facilitate further routing and leave the remainder of the data encrypted for later decryption at a point or various points in the transaction processing network. As another example, the gateway might decrypt all of the token data as a service to the transaction processor and provide clear text data to the transaction processor to facilitate transaction processing. In such an embodiment, the secure transaction module at the gateway can be used to manage decryption services for a plurality of transaction locations and a plurality of transaction processors. Thus, the gateway can be configured to decrypt some or all of the token data as might be appropriate for the given transaction processing network and the given transaction. The gateway might also be configured to re-encrypt some or all of this data prior to forwarding the information along to the transaction processor or the vendor system. In another alternative, a gateway need not be provided and the transaction data can be routed directly to the transaction processing network by the vendor system.

In one example, a unique reference, for example a serial number or other identifier might be used to encrypt the data. For example, a serial number associated with the purchaser data capture device 113 might be used if encryption occurs within the device 113. As another example, a unique reference of the application or terminal might be used if encryption is performed at the terminal. In various embodiments, the reference might be used in a formula to encrypt the data, as a seed to generate an encryption key, and so on. The reference might be shared with the decryption module 122, which as discussed above, might be located at host sever 140, gateway 120, vendor system, or in the transaction processing network 123, to update the decryption key or keys. The purchaser encryption module 132 might have more than one key to encrypt different parts of the card data and thus multiple keys could be utilized to support selective access to the card data among the various entities that have access to the encrypted card data.

In some environments, the links between vendor system 115 and the transaction processor(s) are relatively secure. As such, in one embodiment, vendor system 115 might be configured to decrypt the data prior to transmission for transaction processing. Although not illustrated, vendor system 115 can include decryption algorithms and keys used to decrypt the data prior to transmission.

In a step 98, the encrypted information is decrypted for transaction processing. In the example illustrated in FIG. 2, the transaction data stream or other appropriate transaction data is routed to the transaction processing network 123 entity or entities that will perform the authorization or other approval. In this example illustrated, the decryption occurs in this network or at this institution such that the clear text information can be recovered to facilitate transaction processing. The invention can be implemented to provide the decryption functions at any point in the transaction process as might be appropriate or desired for given security purposes. For example, once the transaction data reaches a secure processing network, it might be appropriate to decrypt the data within that network and handle the data as clear text because the network is secure. As another example, once the transaction reaches a clearing house, a secure transaction module can decrypt the information at or for the clearing house, and the transaction forwarded to the issuing bank for consummation. As yet another example, the transaction can remain encrypted until it reaches the issuing bank and can be decrypted at the issuing bank for processing. Where information is decrypted for handling or other processing (or for other purposes) prior to reaching its final destination, that information can be re-encrypted for subsequent transmissions.

As another example, connections between the gateway 120 and the transaction processing network 123 might themselves be secure connections. In such situations, it might be desirable to decrypt some or all of the transaction data stream at gateway 120 prior to routing to the transaction processing network 123. In furtherance of this example, consider a credit card transaction in which the entire account information is encrypted. It might be desirable in such a situation to have the gateway decrypt the account information to obtain the bank identification number to facilitate routing. With a secure connection, the decrypted information can be left in the clear for transfer to the transaction processing network 123. In another embodiment, the gateway can be configured to re-encrypt some or all of the decrypted information prior to routing.

As another example, even where the routing data is clear, it might be desirable to have a secure transaction module available at the gateway to decrypt the transactions routed by that gateway. As such, a centralized (or somewhat centralized in the case of multiple gateways) decryption process can be implemented to handle decryption in one location (or in predetermined locations), for example by host server 140, for multiple transactions for multiple merchants and multiple issuers. In such an application, centralized decryption can be implemented to provide centralized key management or centralized of other encryption algorithms or information.

Thus, to illustrate two of the possible decryption-placement scenarios, a decryption module is illustrated as decryption module 122A associated with transaction processing network 123 and a decryption module 122B associated gateway 120. As these examples serve to illustrate, decryption of some or all of the information can be performed at one or more points along the network as might be appropriate for a given transaction. As also discussed in further detail below, various levels of encryption and decryption using one or more keys for portions of the data can be included to facilitate routing and handling of transactions in a secure manner.

For example, the gateway can be configured to decrypt the transaction data stream, determine the routing or other gateway-specific information (for example reading the bank identification number for routing), and re-encrypt the data before forwarding it along to the transaction processing network 123. Additionally, in another embodiment as discussed above where the bank identification number, or a portion thereof, might be left in clear text, the gateway or other network components can be implemented to route the transaction based on the clear-text bank identification number such that interim decryption and re-encryption is not used to determine this routing.

In another embodiment, where the secure transaction module is configured to decrypt account information, the secure transaction module can be configured so as to not store clear text account information for security purposes. Thus, in this embodiment, the appliance can be configured to receive encrypted information, perform a decryption and forward the clear text information without storing a local copy of clear text information. In one embodiment, however, hashes of the account information or other token data can be maintained at the secure transaction module to enable the module to check for duplicate transactions. In another embodiment, the secure transaction module can be configured to provide data for reporting or record keeping purposes. For example, the secure transaction module can provide hashes, transaction amounts, merchant IDs, terminal IDs, transaction dates, etc. for reporting transaction information or other data.

In one embodiment, each encrypted transaction that is "hashed" would generate a unique hash code since each encrypted swipe is unique. The hash stored in the secure transaction module could be used to verify that subsequent encrypted transactions are not "replays" of an earlier transaction. This concept would work, however, in an implementation where "merchant A" and "merchant B" might not use the same gateway, a duplicate H-TDES transaction might not be caught since the hash would be stored in separate gateways. Therefore, in one embodiment, secure transaction modules at various gateways (or elsewhere in the processing network) might be configured to share generated hash codes (share information with one another or provide them to a central repository, for example) for comparison purposes to detect fraudulent transactions. The same situation can hold true when signature detection is implemented. Signature detection in one embodiment generates a unique identifier or data stream to represent the original card. To detection of a skimmed card or other fraudulent activities, signature data can be shared among secure transaction modules.

In one embodiment, the bank identification number or other processing information can be encrypted with a first key and account or other information encrypted with a second key. In this embodiment, the gateway or other designated entity can be provided with the first key such that it can decrypt the bank identification number or other transaction processing information that it might use in providing its services in the transaction. For example, where the bank identification number is encrypted and the gateway holds the keys (for example using a secure transaction module), transactions are routed to the gateway to decipher the bank identification number and determine routing. In one embodiment, routing of transactions can be determined based on which entities hold the keys. Additionally, because the account number or other information is encrypted with a second key, this information is not decrypted by the gateway but is passed along in encrypted form to facilitate the transaction. With this embodiment, it can be implemented such that the second key is not stored at the gateway or otherwise maintained at the gateway thus, making it more difficult for the account information to be compromised at the gateway. As such, in one embodiment, the system can be implemented such that the second encryption key is only stored at the transaction processing network to provide an enhanced measure of security for the account information. As another example, all but the first digit of the BIN can be encrypted. Leaving the first digit of the BIN in the clear can be used to facilitate routing by the terminal or other processing device.

As another example, in one embodiment, there can be a plurality of keys to manage different encryption functions. Furthermore, in one embodiment, the invention can be implemented such that the level and type of encryption performed by the encryption module is managed through various keys and also, in some instances, through command tokens (discussed further below). Thus, in one embodiment, a hierarchy key management can be established to include primary keys, OEM keys, merchant keys and terminal keys. In one embodiment, the primary keys can be used during the manufacture of encryption modules to manage serial numbers, and used to generate and enable the OEM key and command card. The OEM key can be used to generate command cards for various levels of encryption (for example, for various BIN ranges); and can also be used to generate and enable the merchant key and command card. The merchant key can be configured to use the same key and command card for all of a merchant's terminals, enabling the terminals to encrypt the Primary Account Number, for example. The merchant key can also be used to generate and enable the terminal key and command card. The terminal key can be used in conjunction with a corresponding command card to delineate which discretionary data to encrypt in each of the tracks.

In one embodiment, keys can be automatically managed and maintained by a key management module, which can be used as a service or as an appliance. As a service, keys can be remotely managed by merchants. Each terminal or group of terminals can be assigned a unique key that is used to decrypt the encrypted card data.

As these examples serve to illustrate, a number of different encryption and decryption scenarios can be provided, encrypting various portions of the data with various keys as well as providing appropriate decryption or re-encryption along the way, as might be appropriate for a given application or for the desired level of security or privacy in some or all of the data.

In a step 99, an authorization response is provided from the transaction processing network 123 indicating the status of the authorization. For example, where the transaction is approved, such authorization is transmitted to the vendor system 115 and can be stored at the vendor system 115 or in a storage device associated with the vendor system 115 for record-keeping purposes or further transactions.

In one embodiment, the invention can be implemented such that the vendor is able to have the transaction qualify as a "swipe" transaction from the issuing bank or other transaction processor. Some banks offer merchants preferred card use rates where the bank card is physically presented for swipe or other read operations as opposed to, say, telephone or conventional internet transactions where a card number is keyed in and accepted at the shoppers word. Because the invention can be implemented such that the card is swiped at the user's computer or other terminal, merchants enabling such transactions in one embodiment can qualify for these preferred rates.

In another embodiment, the invention can be implemented such that it provides a hardware security module or like functionality at the user's terminal. Thus, for example, where the terminal is the user's personal computer, a hardware security module can be provided at the user's personal computer to enable secure transactions. As a further example, the mouse or other peripheral, or other token reading apparatus, can be configured with the encryption algorithms, keys, or other functionality packaged to qualify the reader as a hardware security module. For example, upon tampering, keys or algorithms might be erased, or other security measures can be provided to conform to one or more of the various known industry standards for hardware security modules or the like.

Figure 4:
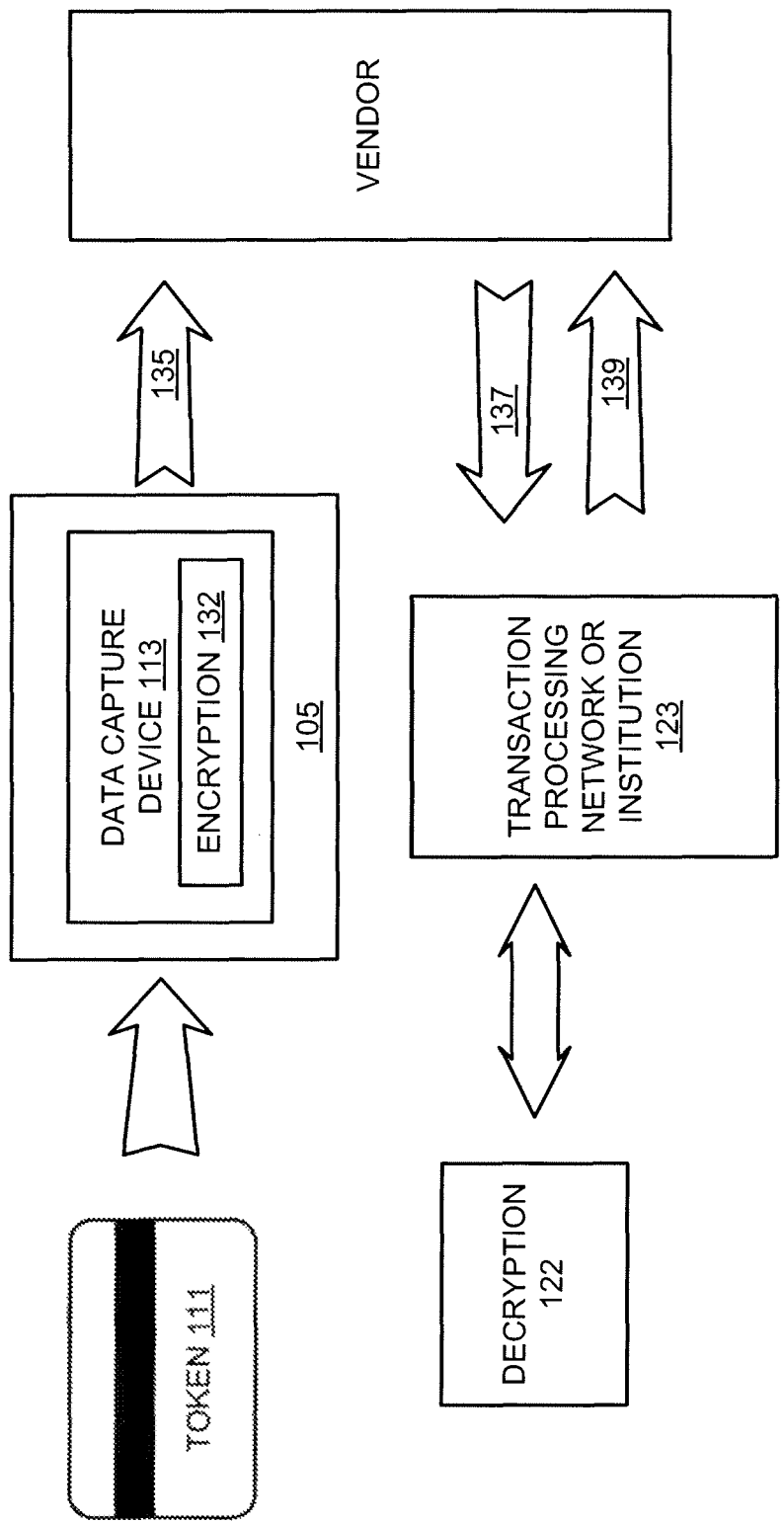
FIG. 4 is an operational flow diagram illustrating a process for enabling secure token transactions in accordance with one embodiment of the invention.

FIG. 4 is a diagram illustrating an example in which a transaction can be processed with the use of a gateway for routing in accordance with one embodiment of the invention. As discussed above, transaction data stream 137 is routed to the transaction processing network 123 for processing of the transaction, decryption 122 can take place at an appropriate point in the transaction processing network to ensure security of the transaction data. The appropriate authorization response 139 can then be sent back to the vendor 115 in furtherance of the transaction.

Figure 5:
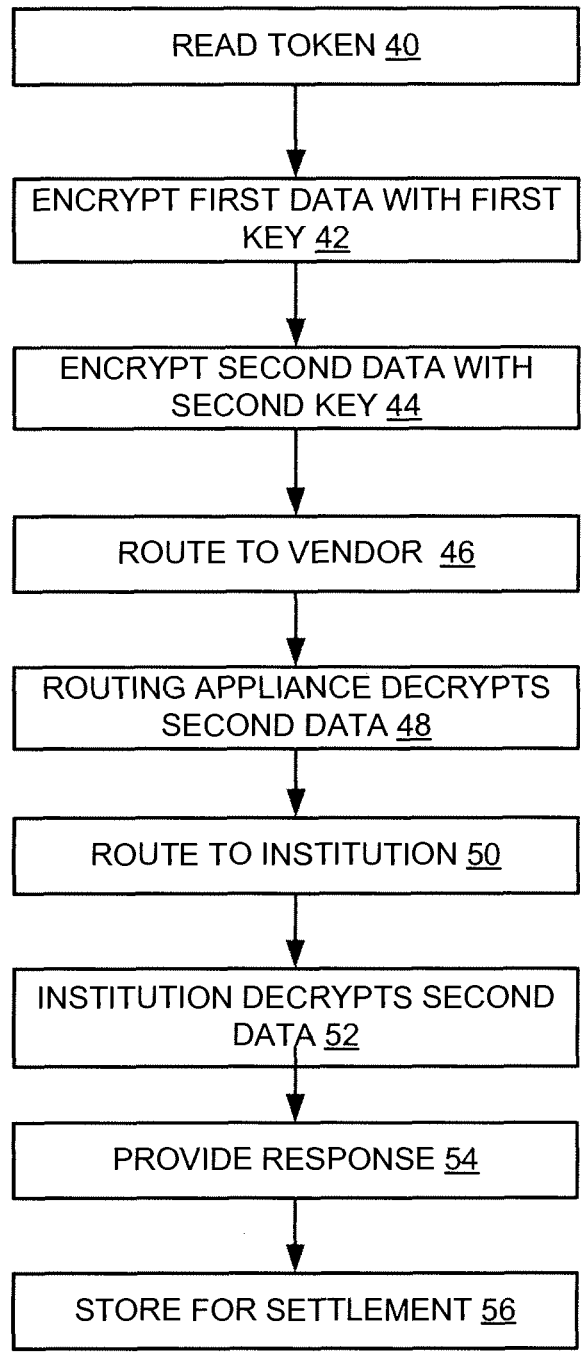
FIG. 5 is an operational flow diagram illustrating a process for enabling secure token transactions in accordance with another embodiment of the invention.

As discussed above, various scenarios can be implemented to provide encryption of some or all of the token data with one or more keys, and decryption at appropriate points in the transaction processing chain to facilitate secure handling of transactions. To further illustrate this feature, another example embodiment is now described. To provide further illustration of this example embodiment, it is discussed in terms of the example environment and more particularly in terms of a credit card transaction. FIG. 5 is an operational flow diagram illustrating an example process using multiple encryption keys to handle a transaction in accordance with one embodiment of the invention. Referring now to FIG. 5, in a step 40, the token is read. Particularly in terms of this example, the token that is read in a step 40 is a credit card, and more particularly the Track 1 and 2 data can be read from the credit card by a magnetic stripe reader or other data capture device 113.

In a step 42, a portion of the credit card data is encrypted with a first key. Particularly, in this example, the primary account number (referred to as a PAN in some applications) read from the token is encrypted with the first key. As discussed above, in one embodiment, only a portion of the account number, or PAN, is encrypted while other portions are left unencrypted. The first key that can be used to encrypt the account number (or a portion thereof) can be selected by any of a number of techniques and properly distributed to the appropriate decryption device to facilitate data handling. In one embodiment, a terminal ID is used for the first encryption key. That is, either the terminal ID itself is the first key or the terminal ID can be used to generate or otherwise identify the first key for encrypting this portion of the account number. For example, the terminal ID can be used with a random number generator, substitution table or other algorithm to generate a key. As another example, the terminal ID can be used as an address or other identifier of the appropriate key stored in a table or database. Using the terminal ID as the encryption key or as a way to identify the encryption key can provide flexibility and features as further described below.

In a step 44, in this embodiment another encryption takes place. Particularly, in this embodiment, a different portion of the token information is encrypted with a second key. For example, the bank identification number, or a portion thereof, is encrypted using the second key. In some applications, the bank identification number (sometimes referred to as a BIN) is part of the account number. In some credit cards, for example, the BIN is the first six digits of the account number.

In one embodiment, the second key can be a key based on the merchant ID, or it can be some other key as might be appropriately selected and distributed. A key based on the merchant ID can be the merchant ID itself or a key generated from or identified by the merchant ID (as discussed above with respect to the Terminal ID). As such, as a result of steps 42 and 44, the token data is encrypted in such a way that a part of the account number is encrypted with a first key (for example, from the terminal ID) and the bank identification number is encrypted with a second key (for example, from the merchant ID).

In the step 46, the properly encoded data is routed to the vendor. This data can be packaged so as to be compatible with various data formats, including conventional vendor formats. The data can be placed in the vendor form and routed to vendor 115. The vendor 115 can then process the order and route the transaction for authorization.

In this example, a gateway 120 is used to facilitate the routing of transactions. As such, in this example, the data is routed to the gateway 120 for further handling. Because the encryption in this example takes place at the purchaser system 105, routing, in one embodiment, be accomplished via un-secure networks as some or all of the account information has been encrypted with one or more keys. Although the routing appliance used in transaction processing in this and other examples is described as a gateway, any of a number of routing appliances, modules or mechanisms can be implemented or utilized to facilitate transaction routing or handling as might be deemed appropriate for a given application or environment. Thus, the term gateway, is used to generally describe such appliances or modules.

In a step 48, gateway 120 receives the transaction data and proceeds to determine appropriate routing for the transaction such that the transaction can be processed. Because, in this example, the bank identification number is encrypted, and it is this number that is used to determine routing, the gateway first decrypts the bank identification number such that the true bank identification number can be determined for routing. For example, the gateway can perform the decryption by sending the information to a secure transaction module for decryption. Once decrypted, gateway 120 routes the transaction to the appropriate institution as depicted by a step 50. In one embodiment, the gateway can re-encrypt the bank identification number using the same or different key.

Note that in one embodiment described above, the bank identification number was encrypted with a key based on the merchant ID. Thus, the gateway can use information about the merchant included with the transaction data to perform the decryption of the bank identification number as appropriate. For example, the gateway might be provided with a database of encryption keys indexed by merchant ID numbers. As such, the gateway can use the appropriate merchant ID to retrieve the appropriate decryption key from the table to perform the bank identification number decryption. In another example, where the merchant ID is used to create the encryption key, a similar algorithm can be provided at the gateway to generate the correct decryption key based on the merchant ID to perform the BIN decryption.

Prior to routing the transaction to the appropriate institution, gateway 120 can either re-encrypt the BIN or leave it in clear text as might be appropriate or desired for the transaction. Note that in one embodiment, it is preferred that the secure transaction module at the gateway not have access to the first key that is used to encrypt the remainder of the account information. As such, a measure of security can be provided to prohibit or deter decryption of the sensitive account information at the gateway 120. Stated another way, using separate keys to encrypt respective portions of information, enables the use and distribution of keys that can provide the ability to control selective decryption of the information at various points in the transaction network.

In a step 52, the appropriate institution receives the transaction routed by the gateway and decrypts the first portion of the account number with the first key. Following with the above example, where the first key is based on the terminal ID, the institution can use information about the terminal ID to recreate the key and provide the appropriate decryption. Once decrypted, the institution can determine whether to authorize the transaction and provide an appropriate response as illustrated in step 54. Thus, the terminal ID (which can refer to an ID of the data capture device for example), or other identifier, is, in one embodiment, appended to the data stream to enable the decrypting appliance (at the authorizing institution in this example) to identify the terminal ID and thus obtain the correct key for decryption.

In a step 56, the terminal can store the transaction for later settlement. For example, in terms of the example credit card transaction, the authorization can be stored for batch settlement purposes. Because, in this scenario, the terminal only had access to the information as encrypted by the data capture device, the information stored in the settlement file for later settlement remains encrypted. Thus, the system can be implemented to maintain or enhance data security during subsequent batch settlement or other settlement operations.

Figure 6:
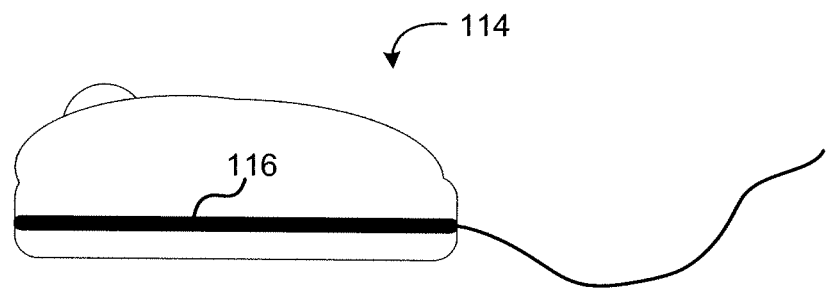
FIG. 6 is an illustration of a secure token reader in accordance with another embodiment of the invention.
Figure 7:
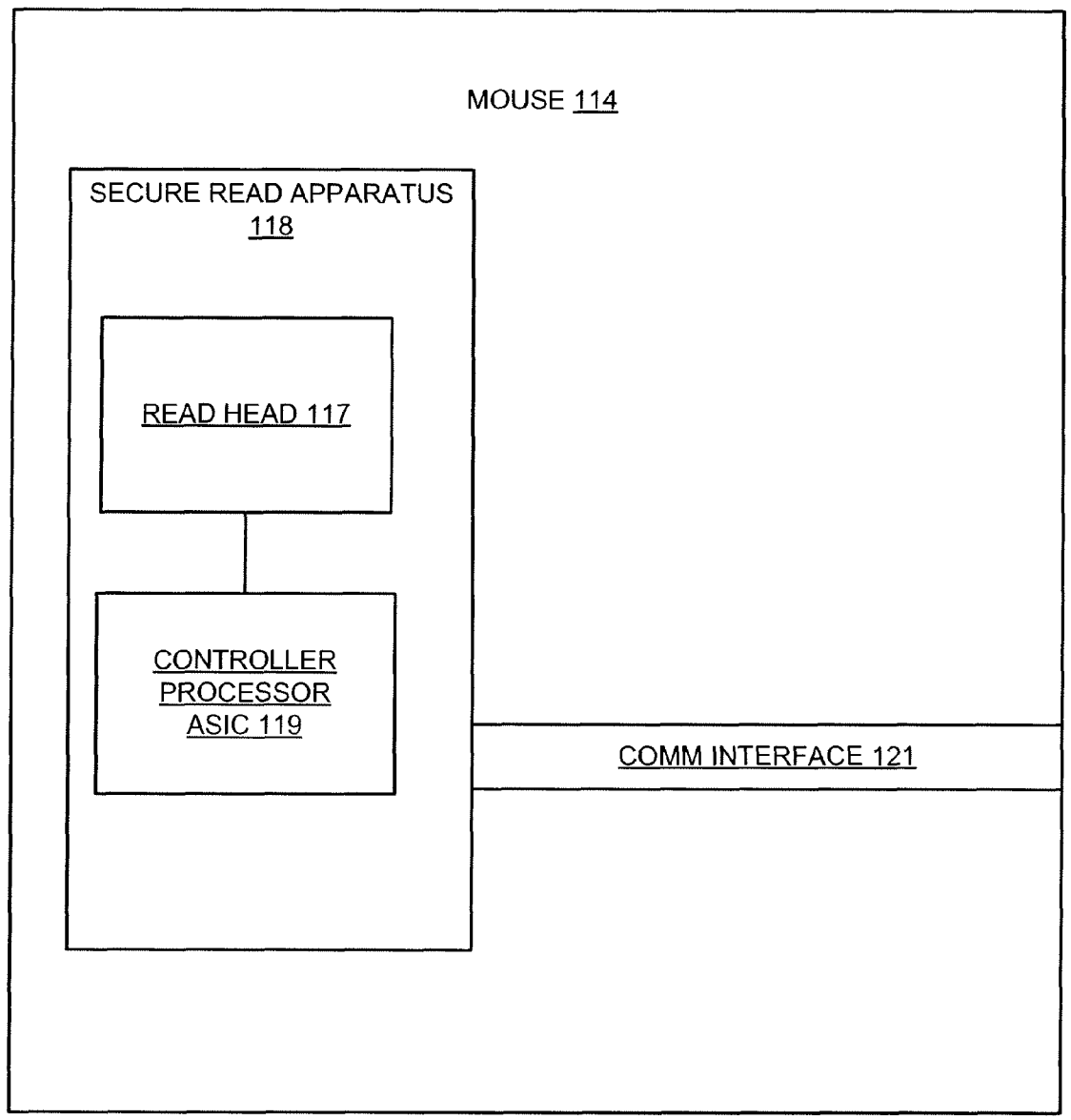
FIG. 7 is a block diagram of a mouse illustrating an implementation of features that can be associated with the invention in accordance with one embodiment of the invention.

As noted above, the data capture can be incorporated into any of a number of different devices for use with the purchaser system 105. One such example already mentioned is a mouse or like pointing device. FIG. 6 is a diagram illustrating a mouse having an integrated magnetic stripe reader in accordance with one embodiment of the invention. FIG. 7 is a functional block diagram of an example mouse with a token reader in accordance with one embodiment of the invention. Referring now to FIGS. 6 and 7, the mouse 114 can include a read apparatus (not illustrated in FIG. 6) located in a channel 116 in the side of the mouse for reading a swiped credit card. In the illustrated example, the mouse 114 might typically include standard mouse components such as, for example, a scroll wheel, buttons etc. The mouse might also include a secure magnetic stripe reader module 118 located in the mouse's housing. An example magnetic stripe reader might include a read head and a head amplifier 117 or other token reader components. A precision peak detector might also be included with a microcontroller 119 to decode the output and provide data. In one embodiment, microcontroller 119 (or other processor, ASIC or control logic) can be configured to perform the encryption as well. In one embodiment, these can be encapsulated with the head to provide an additional measure of security. In one embodiment, the amplifier and processor can be placed on a printed circuit board (PCB). A communications interface 121 provided to interface to the user's computer. Examples of communications interface can include wired or wireless interfaces including, for example USB, WUSB, Bluetooth and other interfaces.

Referring still to FIG. 6, the mouse 114 might be a standard mouse in all other respects but might also include a magnetic stripe reader with magnetic read or read/write heads (or other token read device depending on token type), and might include the above described features. Thus, a purchaser can increase the purchaser's security of his credit card data 101 during transactions with a substitution or an addition of the mouse 114 to the purchaser system 105 and transacting with vendors that utilize the personal swipe system 100. Depending on the vendor forms, in one embodiment the system might be configured to allow the vendor to treat the transaction as a "swipe" transaction, enabling the vendor to receive preferred swipe rates from banks or credit institutions. For example, where a card is swiped by the user and the swipe data entered into the form (encrypted or otherwise) in the swiped format, the vendor might be able to handle the transaction as a swipe transaction.

Encryption module 132 can be encapsulated with the magnetic heads using epoxy or other potting or sealing materials as well as steel or strong casing materials to provide safeguards against tampering with the unit. For example, the encryption module 132 and the read heads can be encapsulated in such a way that it would be difficult or impossible for a would-be tamperer to disassemble the unit to tap into the clear text data stream, or to reverse engineer the encryption algorithms, or to steal the encryption keys, without damaging the unit or leaving signs of tampering. As a further example, encryption module 132 can be implemented on a single substrate or in a single chip and packaged with the read head. Additionally, data detection circuitry and amplifiers (or other data read electronics) can likewise be included in the same chip package. The encryption module can be further implemented such that it does not store or transmit clear text account information to further help secure the information.

In another embodiment, pins or other contacts can be provided at predetermined locations in the package. The epoxy, resin, or other potting material can be a conductive material, thus creating a current path between and among the pins. Control logic in the head (for example, the processor) can measure the resistance across various paths between various pairs of pins. Thus, if an attempt is made to open the device or to probe the circuitry to obtain keys, algorithms or other encryption information, the resistance between one or more pairs of contacts will be changed. As such, intrusion can be detected. In one embodiment, the resistance values are used as a key by the processor to generate the encryption keys or other information. Thus, if the potting material is tampered with, the resistance changes, which changes the key, which affects the keys that the processor ultimately generates. As such, the encryption module will no longer generate valid encrypted data. Additionally, because the encryption keys are generated by the control logic using the key based on the resistance values, the encryption keys themselves are not available until generated. In use, they can be generated in real time or near real time such that valid keys are not stored in the head. Not storing the keys adds a further measure of security. Various alternative contact configurations can be provided. For example, varying length pins can be provided around the periphery of the circuit board that houses the control logic. In one embodiment, pins ranging from approximately ½ mm to 1 mm are provided in an array or about the periphery and in contact with the potting material. In one embodiment, A/D ports of a processor can be used to measure the resistance values for the processor. In another embodiment, the contacts can extend into the head side as well. In such an application, if one were to attempt to cut the head to retrieve the keys, the pins would be cut, altering the resistance of the path between them.

In one embodiment, the potting material can be created or used in a way that is non-uniform, or otherwise not easily reproduced. Thus, for example, if the material characteristics vary in the manufacturing process or from application to application, the material cannot be easily removed and replaced while retaining functionality to create the correct keys. For example, amorphous or inhomogeneous materials can be used such that the conductive properties of the material might vary across its volume, or from application to application, thereby making the material difficult to remove and replace with the same characteristics. As another example, conductive screens or patterns can be used and embedded in the material to provide unique properties. For example, carbon fiber screens, mylar templates with conductive traces, nanotubes and other conductive elements and patterns can be used.

As such, these packaging and encapsulation techniques can be used to safeguard the integrity of the data stream and the encryption algorithms and keys. Additionally, in this example credit card application and other applications, the head or other data read assembly is typically fabricated with a certain degree of precision to enable accurate read and write operations. As such, removing or tampering with an appropriately packaged device could present difficulties for the would-be tamperer to reassemble the device with the level of accuracy and precision necessary to gain the appropriate read/write capabilities. This example illustrates how encryption module 132 can be integrated with, encapsulated with or otherwise implemented with purchaser data capture device 113 to provide certain measures of security against tampering. These or other security features can be provided in one embodiment such that the token reader qualifies as a hardware security module in accordance with one or more known industry standards.

Encryption module 132 might be implemented to encrypt some or all of the data associated with token 101. This might be the case regardless of whether encryption module 132 is implemented within a mouse or other peripheral, as an application on the user's computer or client device, or otherwise. Thus, the data output by the data capture device 113 with the encryption module enabled can include an entire encrypted data stream, or a data stream having a combination of encrypted data and clear text data. In other words, in one embodiment, encryption module 132 can be implemented to selectively encrypt only certain data items of the token data. Additionally, in one embodiment, the invention can be implemented so as to disable encryption module 132 or otherwise bypass encryption module 132 to provide clear text data streams as might be necessary or desirable for a given application.

To better illustrate the process of selectively encrypting some or all of the token data, consider again an example credit card transaction. In such transactions, it might be desirable to encrypt the card account number (or at least a portion thereof) while leaving certain other token information in clear text. As a further example, consider current credit card transactions wherein a customer swipes his or her credit card through a purchaser magnetic stripe reader and the information is sent to a purchaser terminal 145, such as for example a point of sale terminal, to initiate the transaction. In these transactions, the point of sale terminal forwards the data to the vendor and the transaction processing network 123 for authorization.

Because it might be desirable in this and other applications to use certain token information in authorizing the transaction as well as to provide certain of this information on the various receipts, in such applications it might be desirable to leave certain of the token information in the clear to facilitate these operations. Thus, in one embodiment, encryption module 132 can be implemented to provide selective encryption of certain portions of the token data, while leaving other portions of the token data in a clear, or un-encrypted, state. In keeping with the above example, in one embodiment encryption module 132 is implemented so as to encrypt a portion of the account number to provide a certain measure of security to the account information. In one embodiment, encryption can be done using triple DES encryption, although other encryption techniques can be used.

Encryption module 132 in this example implementation can be configured so as to leave the bank identification number and last several digits of the account number in clear text, if desired. This might be desirable in some applications as having a bank identification number in clear text enables the terminal, gateway, or other routing components in the system to use this clear text bank identification number to appropriately route the transaction for approval and settlement. As an example, the customer's name can be left in clear text to allow his or her name to be printed on a confirmation. As another example, in one embodiment, encryption module leaves the first digit of the bank identification number in clear text for recognition by the terminal as representing a valid range. As these examples illustrate, the invention can be implemented so as to select any or all of the token data fields to be encrypted (or portions thereof) as might be desired or required for a given application. Although the term bank identification number or BIN is sometimes used in this document, this term can refer to the traditional BIN used on bank cards, or more generally to any routing character, string or other information used to identify the source of the token or to route transactions. Likewise, the term bank cards can be used to refer to tokens such as, for example, credit cards, debit cards, loyalty cards, payment cards and the like, whether issued by a bank or other entity (for example, American Express, MasterCard, VISA, etc.) or institution, and whether in the form of a magnetic stripe card or otherwise.

The purchaser data capture device 113 might be in communicative contact with a purchaser terminal 145, which can be embodied in any of a number of client devices including, for example, a point of sale terminal, point of access terminal, an authorization station, automated teller machine, computer terminal, personal computer, work stations, cell phone, PDA, handheld computing device and other data entry devices. The terminal 145 might be integral with a data capture device 113 separate from a main personal computer case, for example, it might be part of a mouse or peripheral swipe device. In another alternative, the purchaser terminal 145 might reside in the software environment of a personal computer and receive the card data from the purchaser data capture device 113. In either instance, encryption of the card data might occur within the purchaser data capture device 113 or in the client device such as a personal computer, PDA, cell phone or the like. In a preferred embodiment, encryption of the card data occurs within the purchaser data capture device 113 for enhanced security. In this example, the purchaser data capture device 113 is a separate module from the client device, for example, a mouse with a card swipe reader attached to a personal computer as illustrated in FIG. 6. Although in many applications the purchaser data capture device 113 is physically separated, but in communicative contact with, the purchaser terminal 145, in other environments these items can be in the same housing or in integrated housings.

Figure 9:
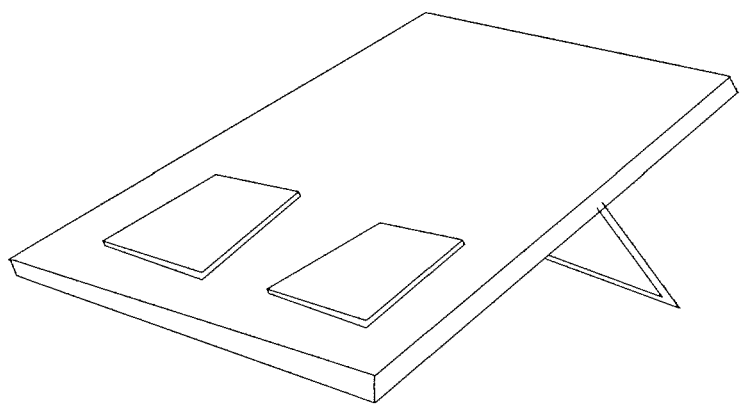
FIG. 9 is a diagram illustrating one such example in accordance with one embodiment of the invention.

Although the embodiment described with respect to FIG. 6 is illustrated as a conventional mouse, other pointing devices and peripherals could be provided with a read apparatus in accordance with the present invention. Another example peripheral with which the invention might be implemented is a slim-profile mouse such as that suitable for storage and charging in a PCMCIA slot of a laptop or notebook computer. FIG. 9 is a diagram illustrating one such example in accordance with one embodiment of the invention. Referring now to FIG. 9, a thin profile mouse can be provided with a read apparatus such as a read head to read token data. For example, MR (magneto-resistive) read heads might be provided in a slot, guide or recess of the mouse to read track data from a credit card moved relative to the head. MR heads are preferable in one embodiment because they can be implemented in a relatively low profile application. Thus, MR heads can be incorporated into the mouse in one embodiment without increasing or substantially increasing the form factor of the mouse. In one embodiment, a slot can be provided in which the card can be swiped. In another embodiment, guides can be provided along a surface of the mouse and the MR head positioned to sense data at the surface of the mouse. In such an embodiment, the mouse is configured such that the card can be swiped along the top or bottom of the mouse, without the need to add a slot. Such an embodiment might be preferable as it can be implemented to have a negligible, if any, impact on the thickness of the mouse. In one embodiment, the low-profile mouse can be configured to be stored and charged in a PCMCIA slot of the user's computer. Thus, contacts (not illustrated) can be provided at one end for data or power transfer. A wired or wireless communications interface can be provided between the mouse and the computer. One example of a form factor that might be implemented with such a mouse is that used by the MoGo Mouse BT™, available from Newton Peripherals, LLC, in Natick, Mass. As would be apparent to one of ordinary skill in the art after reading this description, an appropriate read apparatus and encryption technology can be included with a thin form-factor mouse such as the MoGo Mouse to provide the ability to perform secure transactions as described herein.

Some of the examples described above utilized a scenario where a bank card (magnetic stripe, smart card or otherwise) is presented to enable the user to purchase goods and services from a merchant such as, for example, in an online shopping transaction. In another embodiment, the invention can be implemented to allow the user to use his or her token for alternative purposes. For example, the system can be implemented such that a bank card might be used to authenticate the user for other transactions, to access accounts or data files or for other purposes.

As a further example of this, consider a scenario where a user has a token, such as a bank card, and the bank card has authentication features. The reading of this token and verification of its authenticity can, in one embodiment, be used to approve the holder of the token for other transactions; for access to files, directories or accounts; or for other purposes. The user can present his or her token to the local token reader at his or her terminal, the authenticity verified and this used to grant access to the user.

One example of token authentication is provided by U.S. Pat. No. 5,770,846 issued to Mos et al., and incorporated herein by reference in its entirety. This patent describes a method of determining the distance between transitions on a magnetic track and using this information to generate a signature for the card. Because distance between theoretically regular transitions can display random-like non-uniformity, the measurements of this non-uniformity can be used to provide the unique signature. For example, this determination of distance can be used to characterize the information pattern precisely in order to authenticate the information and the medium on which the information is stored. Due to the randomness in media or materials, the unique signature is difficult to reproduce, even if a card is copied or skimmed. As such, authenticity of a token can be verified by reading the signature of the card and comparing the detected signature with a known valid signature for that card in a database. In such a scenario, when the user swipes her bank card at the terminal, the card signature is determined and verified against the database to authenticate card. Security can be layered by requiring an authentic token and an additional means of verification such as, for example, a password, PIN, biometric scan and the like. As another example, a user might present a different token such as a driver's license and use that token to consummate a credit or debit card purchase. The driver's license can be authenticated and cross-referenced to the user's bank card information, bank account or other financial information to allow the transaction to be completed with the financial information. Password and other further protections can be layered on as well.

Other authentication techniques that could be used in conjunction with the present invention to allow a token such as a bank card (or other token) to be used to control access or authorize transactions are described in U.S. Pat. No. 4,837,426 issued to Pease, (authenticating tokens by analyzing the amplitude of the magnetic signals; U.S. Pat. No. 5,408,505 and U.S. Pat. No. 5,428,683, each issued to Indeck, et al. (authenticating tokens using "noise" in the saturation region of the magnetic data); U.S. Pat. No. 5,235,166, and U.S. Pat. No. 5,430,279, each issued to Fernandez, and U.S. Pat. No. 5,254,843 issued to Hynes (authenticating documents by deriving inherent temporal measurements of timing variations of the data in the reading process); U.S. Pat. No. 5,336,871 issued to Colgate (authenticating a substrate on which a magnetic stripe is affixed); U.S. Pat. No. 5,354,097, issued to Tel (authenticating information using overlays); and U.S. Pat. No. 4,628,195, issued to Baus, (generating a security code number determined by the relative spatial positions of corresponding data in two different forms of encoded data on a card); each of which are incorporated herein in their entirety.

While various embodiments of the present invention have been described above, it should be understood that they have been presented by way of example only, and not of limitation. Likewise, the various diagrams might depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

One of ordinary skill in the art would understand that various features and functions as described in the incorporated by reference documents can be applied and incorporated into the herein described embodiments, and vice versa. Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention might be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases might be absent. The use of the terms "module" and "appliance" or the depiction of a box in a diagram does not imply that the components or functionality described or claimed as part of that item are all configured in a common package. Indeed, any or all of the various components of an item, whether control logic or other components, can be combined in a single package or separately maintained and can further be distributed across multiple locations. Likewise, multiple items can be combined into single packages or locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for conducting transactions between a purchaser and a vendor, comprising:
   reading bank card information for a bank card at a card reader of a purchaser terminal, wherein the bank card information comprises a primary account number (PAN) and a bank identification number (BIN), wherein the card reader comprises at least one of a magnetic stripe reader, a smart card reader, an RFID reader, or a near-field reader, and wherein the bank card is a credit card, debit card, payment card, or loyalty card;
   encrypting the bank card information at the purchaser terminal, wherein encrypting the bank card information comprises encrypting at least a portion of the PAN with a first encryption key and encrypting at least a portion of the BIN with a second encryption key;
   populating a vendor form with the encrypted bank card information; and
   sending the form to the vendor over a communications network, wherein the encryption of the bank card information is transparent to the vendor.

2. The method of claim 1, wherein the encrypted bank card information is provided in the same format as unencrypted bank card information.

3. The method of claim 1, wherein the form includes a toggle to enable entry of encrypted bank card information.

4. The method of claim 1, wherein the card reader comprises a magnetic stripe reader, and wherein reading the bank card information comprises reading the bank card using the magnetic stripe reader.

5. The method of claim 4, wherein the form includes a field for card swipe data.

6. The method of claim 4, wherein the bank card information is encrypted inside a read head of the magnetic stripe reader.

7. The method of claim 4, wherein the magnetic stripe reader is disposed in a peripheral device.

8. A purchaser terminal system, comprising:
   a purchaser terminal;
   a card reader communicatively coupled to the purchaser terminal, wherein the card reader comprises at least one of a magnetic stripe reader, a smart card reader, an RFID reader, or a near-field reader;
   a processor; and
   a non-transitory computer readable medium having instructions embedded therein that, when executed by the processor, cause the purchaser terminal system to:
      read bank card information for a bank card using the card reader, wherein the bank card information comprises a primary account number (PAN) and a bank identification number (BIN), wherein the bank card is a credit card, debit card, payment card, or loyalty card;

encrypt the bank card information, wherein encrypting the bank card information comprises encrypting at least a portion of the PAN with a first encryption key and encrypting at least a portion of the BIN with a second encryption key;

populate a vendor form with the encrypted bank card information; and transmit the form to the vendor over a communications network, wherein the encryption of the bank card information is transparent to the vendor.

9. The purchaser terminal system of claim 8, wherein the encrypted bank card information is provided in the same format as unencrypted bank card information.

10. The purchaser terminal system of claim 8, wherein the form includes a toggle to enable entry of encrypted bank card information.

11. The purchaser terminal system of claim 8, wherein the card reader comprises a magnetic stripe reader, and wherein reading the bank card information comprises reading the bank card using the magnetic stripe reader.

12. The purchaser terminal system of claim 11, wherein the bank card information is encrypted inside a read head of the magnetic stripe reader.

13. The purchaser terminal system of claim 11, wherein the form includes a field for card swipe data.

14. A system comprising:

a card reader, wherein the card reader comprises at least one of a magnetic stripe card reader, a smart card reader, an RFID reader, or a near-field reader; and a non-transitory computer readable medium having instructions embedded therein that, when executed by a processor, cause the system to:

read bank card information for a bank card at the card reader, wherein the bank card information comprises a primary account number (PAN) and a bank identification number (BIN), wherein the bank card is a credit card, debit card, payment card, or loyalty card;

encrypt the bank card information, wherein encrypting the bank card information comprises encrypting at least a portion of the PAN with a first encryption key and encrypting at least a portion of the BIN with a second encryption key; and transmit the encrypted bank card information to a vendor over a communications network, wherein the encryption of the bank card information is transparent to the vendor.

15. The system of claim 14, wherein the card reader comprises a magnetic stripe reader.

16. The system of claim 14, wherein the encrypted bank card information is provided in a same format as unencrypted bank card information.

* * * * *